(12) United States Patent
Funada

(10) Patent No.: US 9,291,882 B2
(45) Date of Patent: Mar. 22, 2016

(54) PROJECTION-TYPE DISPLAY APPARATUS WITH A KEYSTONE CORRECTION FEATURE FOR CORRECTING KEYSTONE DISTORTION IN A PROJECTION IMAGE

(75) Inventor: Masahiro Funada, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 1034 days.

(21) Appl. No.: 12/972,078

(22) Filed: Dec. 17, 2010

(65) Prior Publication Data
US 2011/0157563 A1    Jun. 30, 2011

(30) Foreign Application Priority Data
Dec. 25, 2009  (JP) ................................ 2009-294204

(51) Int. Cl.
G03B 21/14   (2006.01)
G03B 21/26   (2006.01)
H04N 3/23    (2006.01)
G03B 5/02    (2006.01)
H04N 9/31    (2006.01)

(52) U.S. Cl.
CPC  *G03B 21/14* (2013.01); *G03B 5/02* (2013.01); *G03B 21/147* (2013.01); *H04N 3/23* (2013.01); *H04N 9/3185* (2013.01)

(58) Field of Classification Search
CPC ........ G03B 21/26; G03B 21/14; G03B 21/00; G03B 21/32; G03B 21/13; G03B 21/147; H04N 9/3197; H04N 5/74; H04N 5/7416; H04N 5/7425; H04N 5/7441; H04N 5/7458; H04N 9/44; H04N 9/64; H04N 9/3185; H04N 9/31; H04N 9/3194; H04N 3/23

USPC .................... 353/30, 31, 69, 70, 122
See application file for complete search history.

(56) References Cited

U.S. PATENT DOCUMENTS

2002/0060754 A1*  5/2002  Takeuchi ...................... 348/745
2010/0020238 A1*  1/2010  Kim et al. ..................... 348/564

FOREIGN PATENT DOCUMENTS

| JP | 2001-339671 A | 12/2001 |
| JP | 2002-158946 A | 5/2002 |
| JP | 2004-032484 A | 1/2004 |
| JP | 2005-159829 A | 6/2005 |

OTHER PUBLICATIONS

Japanese Office Action issued in corresponding Japanese Patent Application No. 2009-294204 dated May 14, 2013.

* cited by examiner

*Primary Examiner* — Pascal M Bui Pho
(74) *Attorney, Agent, or Firm* — Rossi, Kimms & McDowell LLP

(57) ABSTRACT

A projection-type display apparatus includes a setting unit configured to set a vertical keystone correction value used to correct a vertical distortion of a projection image and a horizontal keystone correction value used to correct a horizontal distortion of the projection image, and an image generator configured to generate an image representing a current vertical keystone correction value and a current horizontal keystone correction value that are set by the setting unit, and a settable range of each of the vertical keystone correction value and the horizontal keystone correction value from the current vertical keystone correction value and the current horizontal keystone correction value.

9 Claims, 4 Drawing Sheets

PROJECTION-TYPE DISPLAY APPARATUS WITH A KEYSTONE CORRECTION FEATURE FOR CORRECTING KEYSTONE DISTORTION IN A PROJECTION IMAGE

BACKGROUND OF THE INVENTION

1. Field of the Invention

The present invention relates to a projection-type display apparatus.

2. Description of the Related Art

Keystone correction is conventionally used to correct a distortion of a projection image of a projector through image processing (Japanese Patent Laid-Open Nos. ("JPs") 2001-339671 and 2005-159829) and manual keystone correction is also available. In the manual keystone correction, a user inputs a vertical keystone value and a horizontal keystone value separately. Lens shift correction is also conventionally used to correct a distortion of a projection image of the projector through optical processing.

For both the keystone correction and the lens shift correction, vertical and horizontal correction parameters, such as a vertical keystone correction value and a horizontal keystone correction value, are correlated with each other, and thus as one of them is corrected a correctable range of the other varies. However, the conventional keystone correction or lens shift correction does not provide to a user the correctable range of the other of the correction parameters which varies as one of the correction parameters is corrected, and thus the operability is poor.

SUMMARY OF THE INVENTION

A projection-type display apparatus according to one aspect of the present invention includes setting unit configured to set a vertical keystone correction value used to correct a vertical distortion of a projection image and a horizontal keystone correction val used to correct a horizontal distortion of the projection image, and an image generator configured to generate an image representing a current vertical keystone correction value and a current horizontal keystone correction value that are set by the setting unit, and a settable range of each of the vertical keystone correction value and the horizontal keystone correction value from the current vertical keystone correction value and the current horizontal keystone correction value.

Further features of the present invention will become apparent from the following description of exemplary embodiments with reference to the attached drawings.

DESCRIPTION OF THE EMBODIMENTS

Referring to the accompanying drawings, a description will be given of embodiments of the present invention.

First Embodiment

Figure 1:
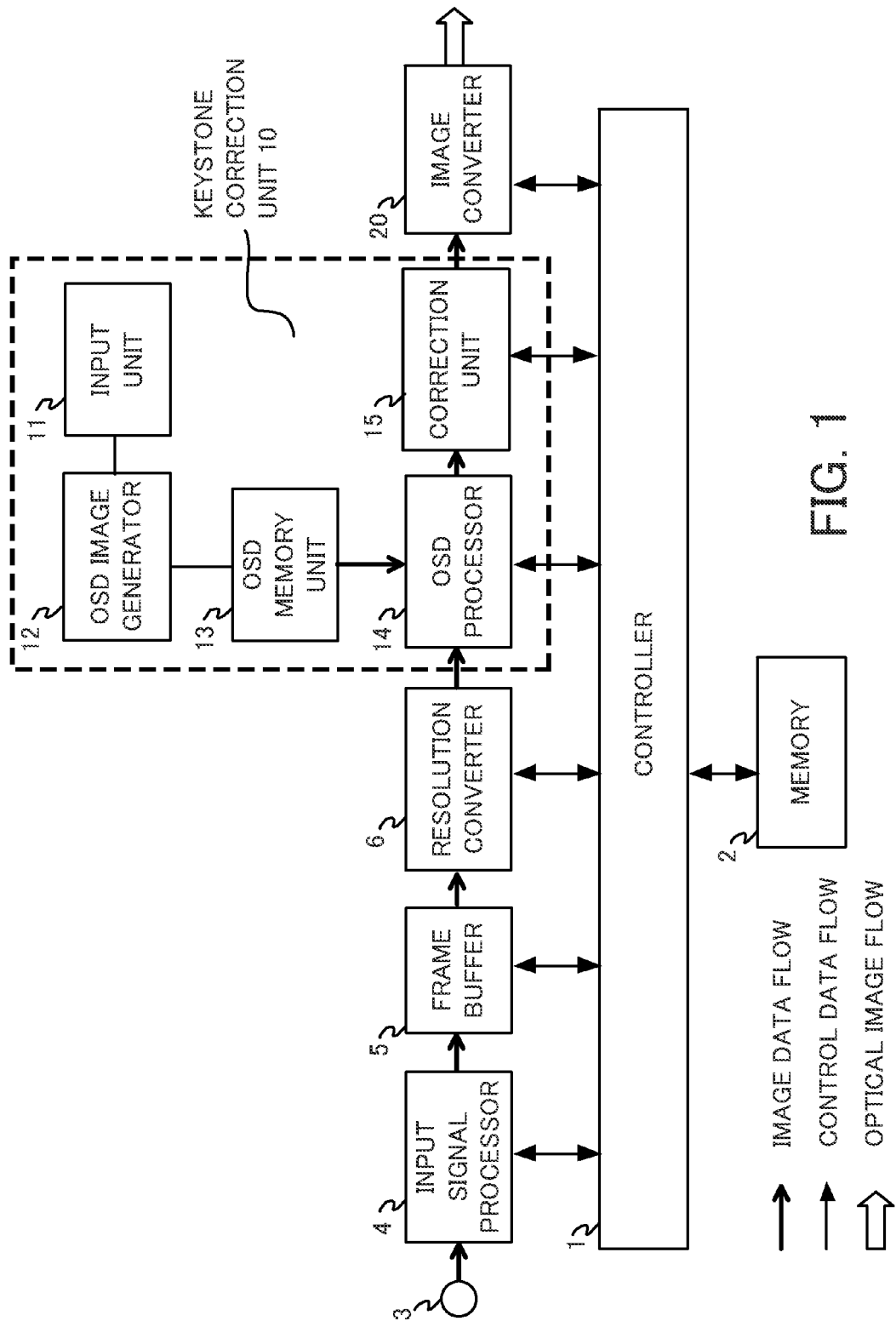
FIG. 1 is a block diagram of a projection-type display apparatus (projector) according to a first embodiment of the present invention.

FIG. 1 is a block diagram of a projection-type display apparatus (projector) of a first embodiment. The projection-type display apparatus includes a controller 1, a memory 2, an image input terminal 3, an input signal processor 4, a frame buffer 5, a resolution converter 6, a keystone correction unit 10, and an image converter 20. "OSD" stands for On-Screen Display.

The controller 1 controls each component in accordance with a variety of programs stored in the memory 2. The image input terminal 3 is an input terminal of an image signal output from a computer and an audio-visual ("AV") unit. The input, signal processor 4 determines a signal format based on an image signal input from the image signal terminal 3, extracts each pixel data of the image signal in accordance with the signal format, and sequentially stores it in the frame buffer 5.

The frame buffer serves as a buffer configured to store each pixel data of the input image signal. The resolution converter 6 reads the pixel data of an area set by the controller 1 from the frame buffer and performs enlargement and reduction processes.

The keystone correction unit 10 includes an input unit (setting unit) 11, an OSD image generator 12, an OSD memory unit 13, an OSD processor 14, and a correction unit 15, and is configured to correct the distortion of a projection image through image processing by setting a vertical keystone correction value and a horizontal keystone correction value.

The input unit (setting unit) 11 includes an input unit, such as a button, a lever, a dial, a keyboard, a ten-key, and a pointing device, and is configured to set a vertical keystone correction value used to correct a vertical distortion of a projection image and a horizontal keystone correction value used to correct a horizontal distortion of the projection image.

The OSD image generator 12 is configured to generate an image representing a currently set vertical keystone correction value and a currently set horizontal keystone correction value, and a settable range of each of the vertical keystone correction value and the horizontal keystone correction value from the currently set vertical keystone correction value and the currently set horizontal keystone correction value. In this embodiment, the OSD image generator 12 generates an image of a keystone adjustment menu that two-dimensionally indicates vertical and horizontal keystone correctable ranges. However, the OSD image generator 12 may generate an image of a current position of each of the vertical keystone correction value and the horizontal keystone correction value, and a settable range of each of them from the current position by utilizing a numerical value, a color, and an arrow.

For example, when the settable range may be displayed with a numerical range. Alternatively, a green image may be displayed when a difference between the current position and a correction value as an upper limiting value is equal to or larger than a predetermined amount, a yellow image may be displayed when a difference between the current position and the correction value as the upper limiting value is larger than 0 but smaller than the predetermined amount, and a red image may be displayed when the current position corresponds to the upper limiting value. In addition, an image of an arrow of an upper direction for the vertical keystone may be displayed until the correction value reaches the upper limiting value, and the image of the arrow of the upper direction may not be displayed when the correction value reaches the upper limiting value.

Figure 2:
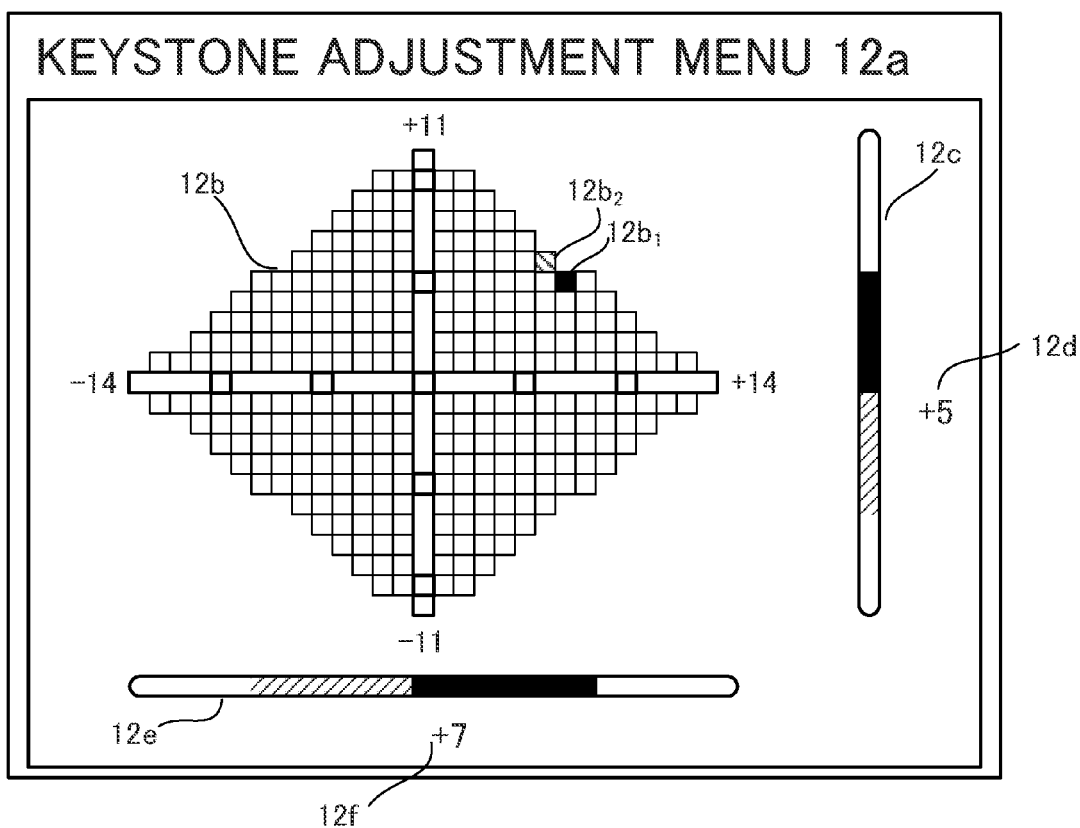
FIG. 2 is a view of a keystone adjustment menu screen.

FIG. 2 illustrates a screen that displays an image of a keystone adjustment menu 12a generated by the OSD image generator 12. While letters of "keystone adjustment menu"

are displayed on the upper left portion of the screen, the display position is not limited and the display itself is arbitrary.

The keystone adjustment menu 12a includes a rhombic area 12b, a vertical bar 12c, a vertical keystone correction value 12d, a horizontal bar 12e, and a horizontal keystone correction value 12f.

The area 12h contains a plurality of square area used to set the vertical keystone correction value and the horizontal keystone correction value. A rhombic shape of the area 12b is merely illustrative, and a plurality of square shapes contained in the area 12b is also illustrative.

As illustrated in FIG. 2, the vertical keystone correction value can be corrected from −11 to +11, and the horizontal keystone correction value can be corrected from −14 to +14. However, the vertical keystone correctable range and the horizontal keystone correctable range are correlated with each other.

In other words, the vertical keystone correctable range from −11 to +11 is available for the horizontal keystone correction value of 0, and as the horizontal keystone correction value varies, the vertical keystone correctable range narrows. Similarly, the horizontal keystone correctable range from −14 to +14 is available for the vertical keystone correction value of 0, and as the vertical keystone correction value varies, the horizontal keystone correctable range narrows.

A black square position $12b_1$ indicates a current position (with a vertical keystone correction value of +5 and a horizontal keystone correction value of +7), and these numerical values are displayed by the vertical keystone correction value 12d on the right end and the horizontal keystone correction value 12f at the bottom.

Thereby, the user can immediately recognize the current set value, and a relationship between the current set value and the limiting set value. For example, the user can recognize that the vertical keystone correction value of +5 cannot be increased any more from the current position $12b_1$ illustrated in FIG. 2, if the current horizontal keystone correction value of +7 is maintained.

Since prior art provide no information of the area 12b to a user, the user cannot determine whether the correction value can be increased or decreased from the current position, or cannot recognize a relationship between the vertical correction value and the horizontal key stone correction value. Therefore, the operability is poor.

On the other hand, according to the projection-type display apparatus of this embodiment, the user can easily recognize the vertical and horizontal keystone correctable ranges from the current position. Hence, the user can manually correct the distortion of the projection image with good operability.

The vertical bar 12c has an overall length, a hatched portion, and a black portion. The overall length corresponds to the vertical keystone correctable range for the horizontal keystone correction value of The hatched portion corresponds to the vertical keystone correctable range for the current horizontal keystone correction value. The black portion corresponds to the current vertical keystone correction value, and a section from the central value of 0 to the current position is blacked. A white portion above the current position of +5 means that the current position corresponds to the upper limiting value and the vertical keystone correction value cannot be increased any more unless the horizontal keystone correction value is reduced.

Similarly, the horizontal bar 12e has an overall length, a hatched portion, and a black portion. The overall length corresponds to the horizontal keystone correctable range for the vertical keystone correction value of 0. The hatched portion corresponds to the horizontal keystone correctable range for the current vertical keystone correction value. The black portion corresponds to the current horizontal keystone correction value, and a section from the central value of 0 to the current position is blacked. At the current position of +7, it is illustrated that the horizontal keystone correction value can be increased by +1.

The OSD image memory unit 13 is a nonvolatile memory, and stores an image, such as the keystone adjustment menu 12a.

The OSD processor 14 is configured to read an image stored in the OSD image memory unit 13 and superimposes it onto an image signal input from the resolution converter 6 in an area set by the controller 1. The OSD processor 14 serves as graphical user interface ("GUI") used to displays menu when the user provides vertical and horizontal keystone adjustments.

The correction unit 15 performs vertical and horizontal keystone correction processes with values set, by the controller 1 for the image signal input from the OSD processor 14. The image converter 20 converts the image signal input from the correction unit 15 into an optical image. The projector further includes a projection unit (not illustrated) configured to project an optical image converted by an image converter 20 onto a screen.

Thus, according to his embodiment, it is easy to recognize the limiting set values of the vertical and horizontal keystone corrections that are correlated with each other, and the user can manually correct the distortion of the projection image with good operability.

At the current position $12b_1$ illustrated in FIG. 2, when a manipulation is made to increase the vertical keystone correction value beyond +5, the controller 1 may move the current position $12b_1$ to a hatched position $12b_2$, illustrated in FIG. 2 (with a vertical keystone correction value of +6 and a horizontal keystone correction value of +6).

Prior art do not respond to a manipulation to set one of the vertical keystone correction value and the horizontal keystone correction value a predetermined set value that exceeds a limiting value if the other of the vertical keystone value and the horizontal keystone value is maintained, and there is a demand of improving the operability.

Accordingly, in that case, the controller 1 may set the keystone correction value in a target direction that is to be manipulated by the user to the predetermined value by varying (increasing or decreasing) the keystone correction value in a non-target direction that is not to be manipulated. Thereby, the user can manually correct the projection image with good operability.

This oblique shift improves the conventional operability even without a display of the area 12b.

In addition, this oblique shift may performed a predetermined time period after the manipulation to set a keystone correction value beyond the correction value as the current limiting value is performed. This delay for the predetermined time period prompts the user to recognize the oblique shift.

Second Embodiment

Figure 3:
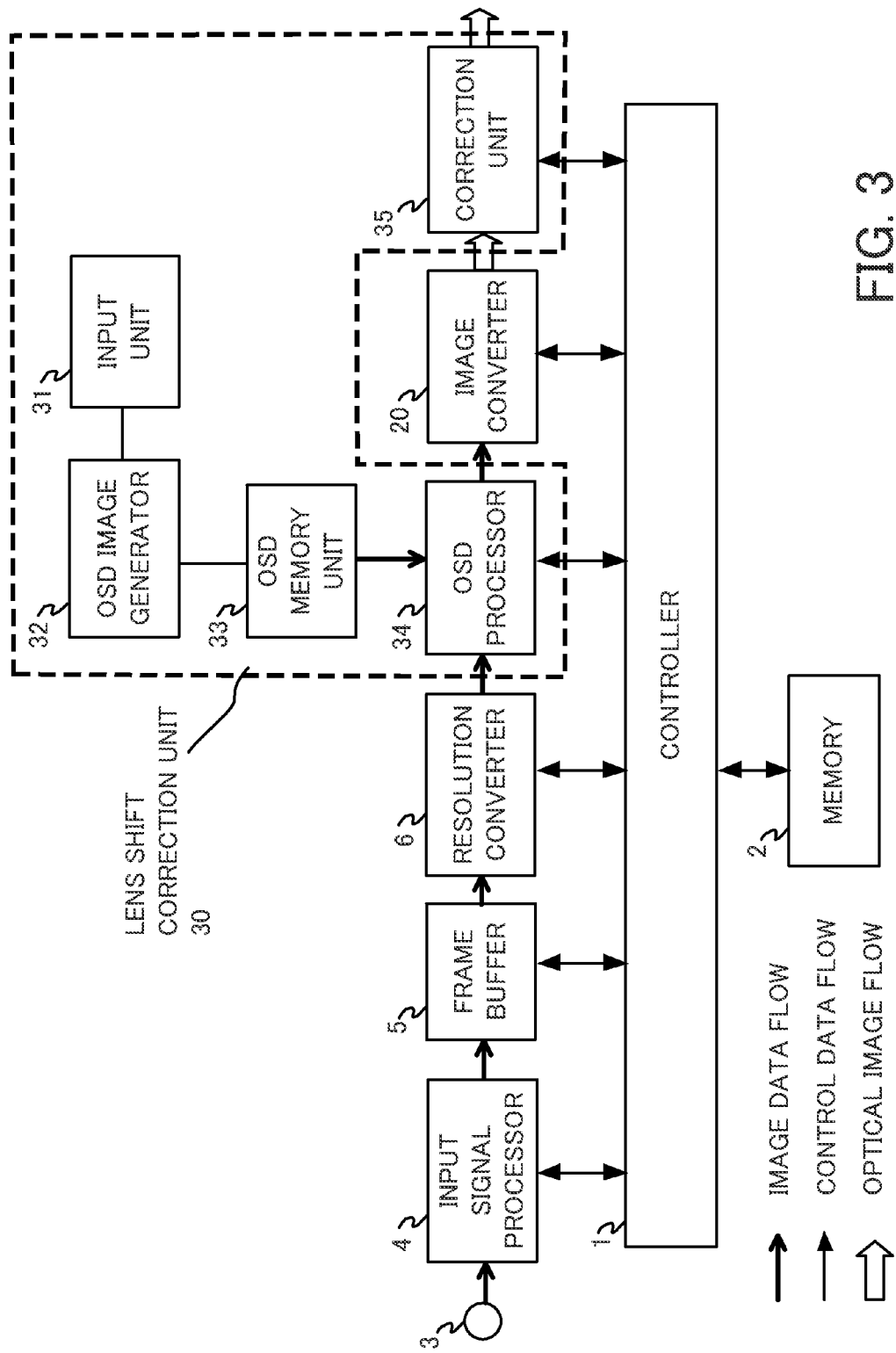
FIG. 3 is a block diagram of a projection-type display apparatus (projector) according to a second embodiment of the present invention.

FIG. 3 is a block diagram of a projection-type display apparatus (projector) of a second embodiment. The projection-type display apparatus includes the controller 1, the memory 2, the image input terminal 3, the input signal processor 4, the frame buffer 5, the resolution converter 6, the image converter 20, and a lens shift correction unit 30. Those elements in FIG. 3, which are corresponding elements in FIG. 1, are designated by the same reference numerals and a description thereof will be omitted.

The lens shift correction unit 30 is configured to correct the distortion of the projection image through optical processing by setting a vertical lens shift amount and a horizontal lens shift amount, and includes an input unit 31, an OSD image generator 32, an OSD memory unit 33, an OSD processor 34, and a correction unit 35, as illustrated by a dotted line.

The input unit (setting unit) 31 includes an input unit, such as a button, a lever, a dial, a keyboard, a ten-key, and a pointing device, and is configured to set a vertical lens shift amount used to shift a vertical position of a projection image and a horizontal lens shift amount used to shift a horizontal position of the projection image.

The OSD image generator 32 is configured to generate an image representing a currently set vertical lens shift amount and a currently set horizontal lens shift amount, and a settable range of each of the vertical lens shift amount and the horizontal lens shift amount from the currently set vertical lens shift amount and the currently set horizontal lens shift amount. In this embodiment, the OSD image generator 32 generates an image of a lens shift adjustment menu that two-dimensionally indicates a vertical lens shiftable range and a horizontal lens shiftable range. However, the OSD image generator 32 may generate an image of a current position of each of the vertical lens shift amount and the horizontal lens shift amount, and a settable range of each of them from the current position by utilizing a numerical value, a color, and an arrow. This is similar to the OSD image generator 12.

Figure 4:
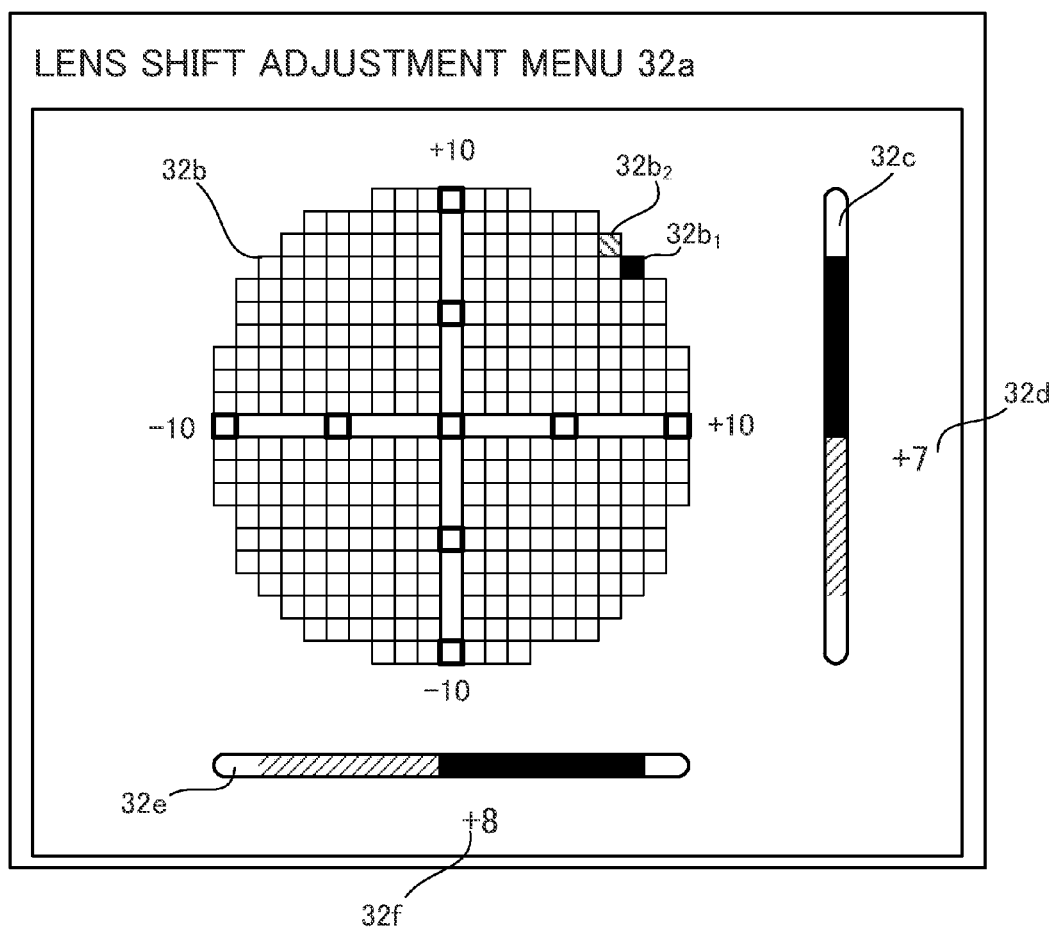
FIG. 4 is a view of a lens shift adjustment menu screen.

FIG. 4 illustrates a screen that displays an image of a lens shift adjustment menu 32a generated by the OSD image generator 32. While the letters of "lens shift adjustment menu" are displayed on the upper left portion of the screen, the display position is not limited and the display itself is arbitrary.

The lens shift adjustment menu 32a includes a circular area 32b, a vertical bar 32c, a vertical lens shift amount 32d, a horizontal bar 32e, and a horizontal lens shift amount 32f.

The area 32h contains a plurality of square areas used to set the vertical lens shift amount and the horizontal lens shift amount. A circular shape of the area 32b is merely illustrative, and a plurality of square shapes contained in the area 32b is also illustrative.

As illustrated in FIG. 4, the vertical lens shift amount can be corrected from −10 to +10, and the horizontal lens shift amount can be corrected from −10 to +10. The vertical lens shiftable range and horizontal lens shiftable range are correlated with each other.

In other words, the vertical lens shiftable range from −10 to +10 is available for the horizontal lens shift amount of 0, and as the horizontal lens shift amount varies, the vertical lens shiftable range narrows. Similarly, the horizontal lens shift amount from −10 to +10 is available for the vertical lens shift amount of 0, and as the vertical lens shift amount varies, the horizontal lens shiftable range narrows.

A black square position $32b_1$ indicates the current position (with a vertical lens shift amount of +7 and a horizontal lens shift amount of +8), and these numerical values are displayed by the vertical lens shift amount 32d on the right end and the horizontal lens shift amount 32f at the bottom.

Thereby, the user can immediately recognize the current set value, and a relationship between the current set value and the limiting set value. For example, the user can recognize that the vertical lens shift amount of +5 cannot be increased any more from the current position $32b_1$ illustrated in FIG. 4, if the current horizontal lens shift amount of +8 is maintained.

Since prior art provides no information of the area 32b to a user, the user cannot determine whether the correction value can be increased or decreased from the current position, or cannot recognize a relationship between the vertical lens shift amount and the horizontal lens shift amount. Therefore, the operability is poor.

On the other hand, according to the projection-type display apparatus of this embodiment, the user can easily recognize the vertical and horizontal lens shiftable ranges from the current position. Hence, the user can manually correct the distortion of the projection image with good operability.

The vertical bar 32c has an overall length, a hatched portion, and a black portion. The overall length corresponds to the vertical lens shiftable range for the horizontal lens shift amount of 0. The hatched portion corresponds to the vertical lens shiftable range for the current horizontal lens shift amount. The black portion corresponds to the current vertical lens shift amount, and a section from the central value of 0 to the current position is blacked. A white portion above the current position of +7 means that the current position corresponds to the upper limiting value and the vertical lens shift amount cannot be increased any more unless the horizontal lens shift amount is reduced.

Similarly, the horizontal bar 32e has an overall length, a hatched portion, and a black portion. The overall length corresponds to the horizontal shiftable range for the vertical lens shift amount of 0. The hatched portion corresponds to the horizontal lens shiftable range for the current vertical lens shiftable range. The black portion corresponds to the current horizontal lens shift amount, and a section from the central value of 0 to the current position is blacked. The white right portion from the current position of +8 means that the current position is the upper limit and the horizontal lens shift amount cannot be increased any more unless the vertical lens shift amount is reduced.

The OSD image memory unit 33 is a nonvolatile memory, and stores an image, such as the lens shift adjustment menu 32a.

The OSD processor 34 is configured to read an image stored in the OSD image memory unit 33 and superimposes it an image goal input from the resolution converter 6 in an area set by the controller 1. The OSD processor 34 serves as a graphical user interface ("GUI") used to display a menu when the user provides vertical and horizontal lens shift adjustments.

The correction unit 35 performs vertical and horizontal lens shift correction processes with values set by the controller 1 for the image signal input from the OSD processor 34.

Thus, according to this embodiment, it is easy to recognize the limiting set values of the vertical and horizontal lens shift amounts that are correlated with each other, and the user can manually correct the distortion of the projection image with good operability.

At the current position $32b_1$ illustrated in FIG. 4, when a manipulation is made to increase the vertical lens shift amount beyond +7, the controller 1 may move the current position $32b_1$ to a hatched position $32b_2$ illustrated in FIG. 4 (with a vertical lens shift amount of +8 and a horizontal lens shift amount of +7).

Prior art do not respond to a manipulation to set one of the vertical lens shift amount and the horizontal lens shift amount a predetermined set value that exceeds a limiting value if the other of the vertical lens shift amount and the horizontal lens shift amount is maintained, and there is a demand of improving the operability.

Accordingly, in that case, the controller 1 may set the lens shift amount in a target direction that is to be manipulated by the user to the predetermined set value by varying (increasing or decreasing) the lens shift amount in a non-target direction that is not to be manipulated. Thereby, the user can manually correct the projection image with good operability.

This oblique shift improves the conventional operability even without a display of the area 32*b*.

In addition, this oblique shift may be performed a predetermined time period after the manipulation to set a lens shift amount beyond the correction value as the current limiting value is performed. This delay for the predetermined time period prompts the user to recognize the oblique shift.

While the present invention has been described with reference to exemplary embodiments, it is to be understood that the invention is not limited to the disclosed exemplary embodiments. The scope of the following claims is to be accorded the broadest interpretation so as encompass all such modifications and equivalent structures and functions.

The projection-type display apparatus is applicable to displaying of an image.

This application claims the benefit of Japanese Patent Application No. 2009-294204, filed December 2009, which is hereby incorporated by reference herein in its entirety.

What is claimed is:

1. A projection-type display apparatus comprising:
    a setting unit configured to set a vertical keystone correction value used to correct a vertical distortion of a projection image and a horizontal keystone correction value used to correct a horizontal distortion of the projection image; and
    an image generator configured to generate an image that includes:
        a current vertical keystone correction value and a current horizontal keystone correction value that are set by the setting unit;
        first settable range within which the setting unit is permitted to vary the vertical keystone correction value based on the current vertical keystone correction value and the current horizontal keystone correction value, and outside of which the setting unit is not permitted to vary the vertical keystone correction value based on the current vertical keystone correction value and the current horizontal keystone correction value;
        a second settable range within which the setting unit is permitted to vary the horizontal keystone correction value based on the current vertical keystone correction value and the current horizontal keystone correction value, and outside of which the setting unit is not permitted to vary the horizontal keystone correction value based on the current vertical keystone correction value and the current horizontal keystone correction value;
        a first maximum range for the vertical keystone correction value, within which the first settable range falls, that is variable as the horizontal keystone correction value is varied and that is equal to the first maximum range when the horizontal distortion is not corrected; and
        a second maximum range for the horizontal correction value, within which the second settable range falls, that is variable as the vertical keystone correction value is varied and that is equal to the second maximum range when the vertical distortion is not corrected.

2. The projection-type display apparatus according to claim 1, wherein the image generated by the image generator further includes a two-dimensional area showing the first and second settable ranges and the current vertical keystone correction value and the current horizontal keystone correction value.

3. The projection-type display apparatus according to claim 2, wherein the two-dimensional area has a rhombic shape.

4. The projection-type display apparatus according to claim 2, wherein the two-dimensional area is expressed by a coordinate system that defines the horizontal keystone correction value along an X axis and the vertical keystone correction value along a Y axis.

5. The projection-type display apparatus according to claim 1, wherein as the first settable range becomes wider, the second settable range becomes narrower.

6. The projection-type display apparatus according to claim 1, wherein the current vertical keystone correction value, the first settable range, and the first maximum range appear in a first area, and the current horizontal keystone correction value, the second settable range, and the second maximum range appear in a second area different from the first area in the image.

7. The projection-type display apparatus according to claim 1, wherein the current vertical keystone correction value is displayed in the first settable range, and the current horizontal keystone correction value is displayed in the second settable range.

8. The projection-type display apparatus according to claim 1, further comprising a controller configured to vary one of the current vertical or horizontal keystone correction value when the setting unit receives an input to vary the other of the current vertical or horizontal keystone correction values to a value outside of a corresponding one of the first or second settable ranges.

9. The projection-type display apparatus according to claim 1, further comprising a projection unit configured to project the image.

* * * * *